(12) United States Patent
Lee et al.

(10) Patent No.: US 10,880,841 B2
(45) Date of Patent: Dec. 29, 2020

(54) METHOD AND APPARATUS FOR CONTROLLING TRANSMISSION POWER IN WLAN SYSTEM

(71) Applicant: ELECTRONICS AND TELECOMMUNICATIONS RESEARCH INSTITUTE, Daejeon (KR)

(72) Inventors: Il-Gu Lee, Seoul (KR); Jeeyon Choi, Daejeon (KR); Sok-Kyu Lee, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

(21) Appl. No.: 14/868,817

(22) Filed: Sep. 29, 2015

(65) Prior Publication Data

US 2016/0021619 A1    Jan. 21, 2016

Related U.S. Application Data

(63) Continuation of application No. 14/265,083, filed on Apr. 29, 2014, now Pat. No. 9,161,316, which is a
(Continued)

(30) Foreign Application Priority Data

Oct. 23, 2009    (KR) .......................... 10-2009-0101232

(51) Int. Cl.
*H04W 52/24*    (2009.01)
*H04W 24/08*    (2009.01)
(Continued)

(52) U.S. Cl.
CPC ......... *H04W 52/242* (2013.01); *H04W 24/08* (2013.01); *H04W 52/243* (2013.01);
(Continued)

(58) Field of Classification Search
CPC ... H04W 52/242; H04W 24/08; H04W 52/18; H04W 52/22; H04W 52/241; H04W 52/246; H04W 52/247
See application file for complete search history.

(56) References Cited

U.S. PATENT DOCUMENTS 8,050,360 B2 *  11/2011  Wentink ................ H04W 40/10
                                                      375/315
8,750,269 B2 *  6/2014  Lee ..................... H04W 52/242
                                                      370/338
(Continued)

OTHER PUBLICATIONS

Daji Qiao et al., "Adaptive Transmit Power Control in IEEE 802.11a Wireless LANs", IEEE VTC, Apr. 2003, pp. 433-437, vol. 1.

*Primary Examiner* — Kevin D Mew

(57) ABSTRACT

A transmit power control method of a first station in a wireless LAN (WLAN) system includes: receiving path loss information from an (access point) AP, the path loss information containing a maximum value among path losses between the AP and at least one or more stations included in the WLAN system; controlling a transmit power by using the path loss information; and transmitting a frame according to the controlled transmit power. In said controlling the transmit power by using the path loss information, the transmit power is controlled by using a path loss obtained by adding the maximum value and a path loss between the first station and the AP or by using the path loss between the first station and the AP.

29 Claims, 6 Drawing Sheets

Related U.S. Application Data continuation of application No. 12/910,718, filed on Oct. 22, 2010, now Pat. No. 8,750,269.

(51) Int. Cl.
*H04W 52/26* (2009.01)
*H04W 84/12* (2009.01)

(52) U.S. Cl.
CPC .......... *H04W 52/267* (2013.01); *H04W 84/12* (2013.01); *Y02D 30/70* (2020.08)

(56) References Cited

U.S. PATENT DOCUMENTS

| | | | |
|---|---|---|---|
| 9,161,316 B2* | 10/2015 | Lee | H04W 52/242 |
| 2002/0168993 A1* | 11/2002 | Choi | H04W 52/10 |
| | | | 455/522 |
| 2005/0063356 A1* | 3/2005 | Larsen | H04L 43/0852 |
| | | | 370/351 |
| 2006/0281422 A1 | 12/2006 | Pan et al. | |
| 2007/0060057 A1* | 3/2007 | Matsuo | H04B 1/0475 |
| | | | 455/63.1 |
| 2013/0044680 A1* | 2/2013 | Abraham | H04W 16/14 |
| | | | 370/328 |
| 2014/0372274 A1* | 12/2014 | Barry | G06Q 40/04 |
| | | | 705/37 |
| 2015/0085732 A1* | 3/2015 | Bao | H04W 52/10 |
| | | | 370/312 |
| 2015/0131641 A1* | 5/2015 | Ong | H04W 52/242 |
| | | | 370/338 |
| 2017/0201995 A1* | 7/2017 | Rong | H04W 52/245 |

* cited by examiner

METHOD AND APPARATUS FOR CONTROLLING TRANSMISSION POWER IN WLAN SYSTEM

CROSS-REFERENCE(S) TO RELATED APPLICATIONS

The present application is a continuation of U.S. patent application Ser. No. 14/265,083, filed on Apr. 29, 2014, which is a continuation of U.S. patent application Ser. No. 12/910,718, filed on Oct. 22, 2010, which claims priority of Korean Patent Application No. 10-2009-0101232, filed on Oct. 23, 2009, which is incorporated herein by reference in its entirety.

BACKGROUND OF THE INVENTION

Field of the Invention

Exemplary embodiments of the present invention relate to a transmit power control method and apparatus in a wireless LAN (WLAN) system; and, more particularly, to a transmit power control method and apparatus which controls a transmit power by using a path loss between a station and an access point (AP) in a WLAN system.

Description of Related Art

In a wireless communication device, a transmission terminal requires 2-2.5 times larger power consumption than a reception terminal, and the power consumption required by the transmission terminal depends significantly on the magnitude of transmit power. In general, a commercial wireless LAN device focuses on the transmission performance rather than the power consumption. Therefore, when transmitting a frame, the commercial wireless LAN device sets a transmit power to the maximum transmit power.

When a portable device uses the maximum transmit power, the power consumption efficiency of a wireless station may become a problem. A dynamic transmit power control function of the wireless communication system for the power consumption efficiency may not only reduce battery consumption, but also improve the immunity to interference.

Conventionally, research has been conducted on a transmit power control method between a station and an AP or between a station and a station. However, an algorithm combined with transmit rate control is required in terms of link control, and a transmit power control scheme is required in which a hidden node problem and a basic service set (BSS) network unit are simultaneously considered.

The hidden node problem occurs when a signal transmitted from a specific station within a basic service set suffers from a path loss caused by a channel and does not approach the receive sensitivity of another station. In this case, when a station occupies a channel, another station may not recognize the occupation. Furthermore, as another station attempts to transmit a signal, signal collision may occur. In order to minimize the hidden node problem, ready-to-send (RTS) and clear-to-send (CTS) frames are used. After the RTS and CTS frames are transmitted at the maximum power, a station may occupy a channel and acquire a transmit opportunity. In this case, the station may transmit data at a proper transmit power during the acquired transmit opportunity.

During frequent data communication processes, the exchange of RTS and CTS frames using the maximum transmit power may serve as a main factor which reduces the throughput efficiency and power consumption efficiency of a wireless station. Furthermore, the performance of a station included in the radio range of an AP belonging to different BSSs may be reduced, and the performance of another station may be reduced by a station belonging to an overlapping basic service set (OBBS). In a case of the next-generation WLAN system, the bandwidth may be widened, and a multi-mode and multi-user scheme may be used. Therefore, it is expected that the interference problem will be serious in the next-generation WLAN system.

SUMMARY OF THE INVENTION

An embodiment of the present invention is directed to a transmit power control method and apparatus in a WLAN system, which is capable of improving power consumption efficiency while maintaining communication performance.

Another embodiment of the present invention is directed to a transmit power control method and apparatus in a WLAN system, which is capable of solving a hidden node problem and a problem caused by an OBSS.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a transmit power control method of a first station in a WLAN system includes: receiving path loss information from an AP, the path loss information containing a maximum value among path losses between the AP and at least one or more stations included in the WLAN system; controlling a transmit power by using the path loss information; and transmitting a frame according to the controlled transmit power. In said controlling the transmit power by using the path loss information, the transmit power is controlled by using a path loss obtained by adding the maximum value and a path loss between the first station and the AP or by using the path loss between the first station and the AP.

In accordance with another embodiment of the present invention, a transmit power control method of a first station in a WLAN system includes: acquiring a first path loss between the first station and at least one or more stations included in the WLAN system and a second path loss between the first station and an AP; controlling a transmit power by using the first and second path losses; and transmitting a frame according to the controlled transmit power. In said controlling the transmit power by using the first and second path losses, the transmit power is controlled by using a maximum value of the first and second path losses or by using the second path loss.

In accordance with another embodiment of the present invention, a transmit power control method of an AP in a WLAN system including at least one or more stations includes: acquiring a path loss between the AP and the station; controlling a transmit power according to a maximum value among the path losses; and transmitting a frame according to the controlled transmit power.

In accordance with another embodiment of the present invention, a transmit power control apparatus includes: a reception unit configured to receive path loss information from an AP, the path loss information containing a maximum value among path losses between the AP and at least one or more stations included in a WLAN system; and a control unit configured to control a transmit power by using the path loss information. The control unit controls the transmit power by using a path loss obtained by adding the maximum value and a path loss between the first station and the AP or by using the path loss between the first station and the AP.

In accordance with another embodiment of the present invention, a transmit power control apparatus includes: an acquisition unit configured to acquire a first path loss between a station including the transmit power control apparatus and at least one or more stations included in a WLAN system and a second path loss between the station including the transmit power control apparatus and an AP; and a control unit configured to control a transmit power by using the first and second path losses. The control unit controls the transmit power by using a maximum value of the first and second path losses or by using the second path loss between the station including the transmit power control apparatus and the AP.

In accordance with another embodiment of the present invention, a transmit power control apparatus in a WLAN system including at least one or more stations includes: an acquisition unit configured to acquire a path loss between the station and an AP including the transmit power control apparatus; and a control unit configured to control a transmit power according to a maximum value among the path losses.

DESCRIPTION OF SPECIFIC EMBODIMENTS

Figure 1:
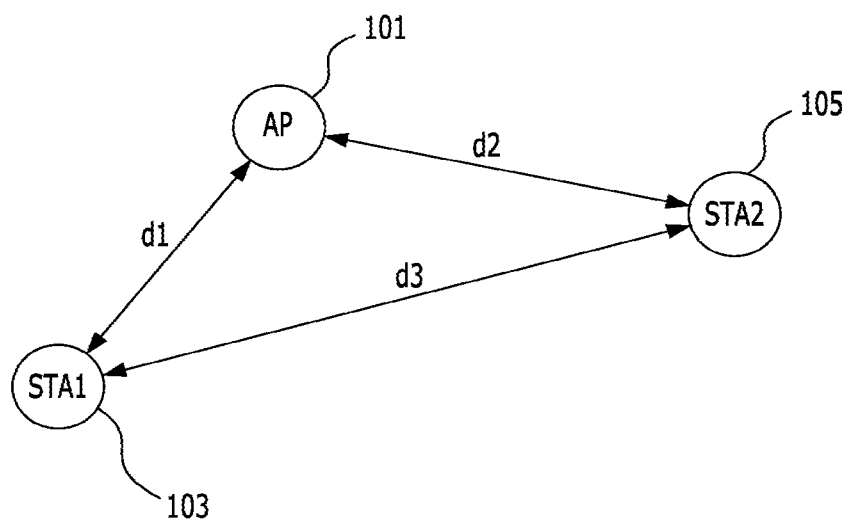
FIG. 1 is a diagram explaining the concept of a transmit power control method in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

A transmit power control method and apparatus in accordance with an embodiment of the present invention controls a transmit power by using a path loss between an AP and a station. As the path loss is used, a frame does not need to be transmitted at the maximum power, but the transmit power may be controlled to transmit a frame.

For example, when a first station knows a path loss between the first station and a second station which is the most remote from the first station, the first station does not need to transmit a frame at the maximum transmit power, but may control the transmit power according to the path loss and transmit a frame. That is, the first station may control the transmit power such that the radio range of the first station does not exceed the second station. In this case, the communication performance may be maintained, and the power consumption depending on the frame transmission may be reduced.

That is, the transmit power control method and apparatus in accordance with the embodiment of the preset invention may improve the power consumption efficiency by controlling the transmit power according to the path loss.

Meanwhile, the transmit power control method and apparatus in accordance with the embodiment of the present invention may control the transmit power while operating in a high-speed mode or a low-power mode. In the high-speed mode, data frames are transmitted and received without using RTS and CTS frames. Since RTS and CTS frames are not used in the high-speed mode, data may be transmitted at a high speed. In the low-power mode, RTS and CTS frames are used to transmit and receive data frames. That is, the transmit power control method and apparatus in accordance with the embodiment of the present invention may control the transmit power by using the high-speed mode or the low-power mode depending on the frames.

Meanwhile, a mode in which frames are transmitted and received at the maximum transmit power is referred to as a maximum power mode. The transmit power control method depending on the high-speed mode or the low-power mode may differ according to a path loss to be used.

Hereafter, the transmit power control method and apparatus in accordance with the embodiment of the present invention will be described in more detail with reference to the drawings.

FIG. 1 is a diagram explaining the concept of a transmit power control method in accordance with an embodiment of the present invention.

FIG. 1 shows a transmit power control method in a WLAN system including one AP 101 and two stations 103 and 105. Furthermore, FIG. 1 shows two examples of the transmit power control method depending on path losses to be used. First, the first example will be described, and the second example will be then described.

In accordance with the first example, path losses between the AP 101 and the stations 103 and 105 are used. That is, the path loss between the AP 101 and the station 103 and the path loss between the AP 101 and the station 105 are used. The path loss may be measured by the station or the AP.

The AP 101 transmits a maximum value of the path losses to the first and second stations 103 and 105. The first station 103 may control the transmit power by using a path loss obtained by adding the maximum value and the path loss between the first station 103 and the AP 101 or by using the path loss between the first station 103 and the AP 101, depending on the high-speed mode or the low-power mode.

Since RTS and CTS frames are not used in the high-speed mode, the first station 103 controls the transmit power, based on the path loss obtained by adding the maximum value and the path loss between the first station 103 and the AP 101. In FIG. 1, the maximum path loss is a path loss between the AP 101 and the second station 105. That is, the first station 103 controls the transmit power, based on a path loss obtained by adding the path loss between the AP 101 and the first station 103 and the path loss between the AP 101 and the second station 105. The path loss increases in proportional to a signal transmission distance.

The first station 103 may transmit a data frame to the AP 101 according to the transmit power controlled by the above-described method. That is, the first station 103 may control the transmit power, based on a path loss corresponding to a distance (d1+d2), and transmit a data frame to the AP 101 according to the controlled transmit power.

A distance d3 between the first station 103 and the second station 105 is smaller than the distance (d1+d2). Therefore, in accordance with the first example, the second station 105 may be included in the transmission signal range of the first station 103. Accordingly, although the RTS and CTS frames are not used, the second station 105 may detect a signal of the first station 103. Therefore, a signal collision problem caused by a hidden node problem may be solved, and the transmit power may be reduced. Furthermore, since the RTS and CTS frames are not used, the throughput may be improved.

Next, when the first station 103 transmits an RTS frame in the low-power mode, the first station 103 may control the transmit power, based on a path loss obtained by adding the maximum value and the path loss between the first station 103 and the AP 101. Alternatively, the first station 103 may transmit an RTS frame at the maximum transmit power. Then, when the first station 103 acquiring a transmission opportunity transmits a data frame, the first station 103 controls the transmit power, based on the path loss between the first station 103 and the AP 101.

In the low-power mode, the first station 103 acquires a transmission opportunity by using the RTS frame. Therefore, when transmitting a data frame, the first station 103 does not need to control the transmit power, based on the path loss obtained by adding the maximum value and the path loss between the first station 103 and the AP 101. That is, when transmitting a data frame in the low-power mode, the first station 103 does not need to control the transmit power as in the high-speed mode.

Meanwhile, the AP 101 may transmit the maximum value and the second largest value among the path losses to the first and second stations 103 and 105. The second largest value is transmitted for the sake of the second station 105 corresponding to the maximum path loss. The second station 105 may control the transmit power, based on a path loss obtained by adding the maximum value and the second largest value among the path losses. The second station 105 may control the transmit power, based on a path loss corresponding to double the maximum value among the path losses. In this case, however, a loss may occur in the transmit power, compared with the former case.

In accordance with the second example, path losses among all WLAN devices included in the WLAN system are used. That is, the path loss between the AP 101 and the first station 103, the path loss between the AP 101 and the second station 105, and the path loss between the first station 103 and the second station 105 are used.

In the second example, different path losses are used in comparison with the first example, but the basic transmit power control method is similar to that of the first example. However, the first example has an advantage in that the design is simple and data may be transmitted at a high speed because the RTS and CTS frames are not used. The second example has an advantage in that the transmit power may be minimized.

In the case of the high-speed mode or the RTS frame transmission in the first example, the first station 103 transmits a frame according to the transmit power corresponding to the distance (d1+d2). In the second example, however, the first station 103 may transmit a frame according to a transmit power corresponding to a distance d3. That is because the path loss between the first station 103 and the second station 105 is used in the second example. Therefore, in accordance with the second example, it is possible to minimize the transmit power, compared with the first example.

Hereafter, the second example will be described in detail.

The first station 103 acquires a first path loss between the first station 103 and the second station 105 and a second path loss between the first station 103 and the AP 101. Then, the first station 103 controls a transmit power by using the first and second path losses. Specifically, the first station 103 may control the transmit power by using a maximum value of the first and second path losses or control the transmit power by using the second path loss, depending on the high-speed mode or the low-power mode.

In the high-speed mode, RTS and CTS frames are not used. Therefore, the first station 103 controls the transmit power, based on the maximum value of the first and second path losses. The first station 103 may transmit a data frame to the AP 101 according to the transmit power controlled by the above-described method. In FIG. 1, the maximum value is the first path loss. That is, the first station 103 may control the transmit power, based on the path loss corresponding to the distance d3, and transmit a data frame to the AP 101 according to the controlled transmit power.

In accordance with the second example, the second station 105 is included in the transmission signal range of the first station 103. Therefore, although RTS and CTS frames are not used, the second station 105 may detect a signal of the first station 103. Accordingly, a signal collision problem caused by a hidden node problem may be solved, and the transmit power may be reduced. Furthermore, since RTS and CTS frames are not used, the throughput may be improved.

Next, when transmitting an RTS frame in the low-power mode, the first station 103 may control a transmit power, based on the maximum value of the first and second path losses. Alternatively, the first station 103 may transmit an RTS frame at the maximum transmit power. Then, when the first station 103 acquiring a transmission opportunity transmits a data frame, the first station 103 controls the transmit power, based on the second path loss.

So far, the transmit power control method of the first station 103 has been described. However, the second station 105 may also control a transmit power, like the first station 103.

Meanwhile, the AP 101 controls a transmit power according to a maximum value of the path losses between the AP 101 and the first and second path losses 103 and 105. That is, the AP 101 may acquire the path loss between the AP 101 and the first station 103 and the path loss between the AP 101 and the second station 105, and control the transmit power according to the maximum value of the acquired path losses.

In the WLAN system, communication is centered around the AP 101. Therefore, as the AP 101 controls the transmit power based on the maximum path loss, the power consumption may be reduced, and frames may be transmitted and received without signal collision. In FIG. 1, the maximum path loss based on the AP 101 is the path loss between the AP 101 and the second station 105. That is, the AP 101 controls the transmit power according to the path loss corresponding to the distance d2, and transmits frames to the first and second stations 103 and 105 according to the controlled transmit power. The first station 103 may be included in the transmission signal range of the AP 101.

The above-described high-speed and low-power modes may be selected according to the following standards, for example. The high-speed and low-power modes may be selected depending on whether the transmit rate is preceded or the power consumption is preceded. When the transmit rate is preceded, the high-speed mode may be selected in case where traffic is larger than a preset threshold value, and the low-power mode may be selected in case where traffic is smaller than the preset threshold value. When the power consumption is preceded, the high-speed mode may be selected in case where the power amount of a station is larger than a preset threshold value, and the low-power mode may be selected in case where the power amount is smaller than the preset threshold value.

Figure 2A:
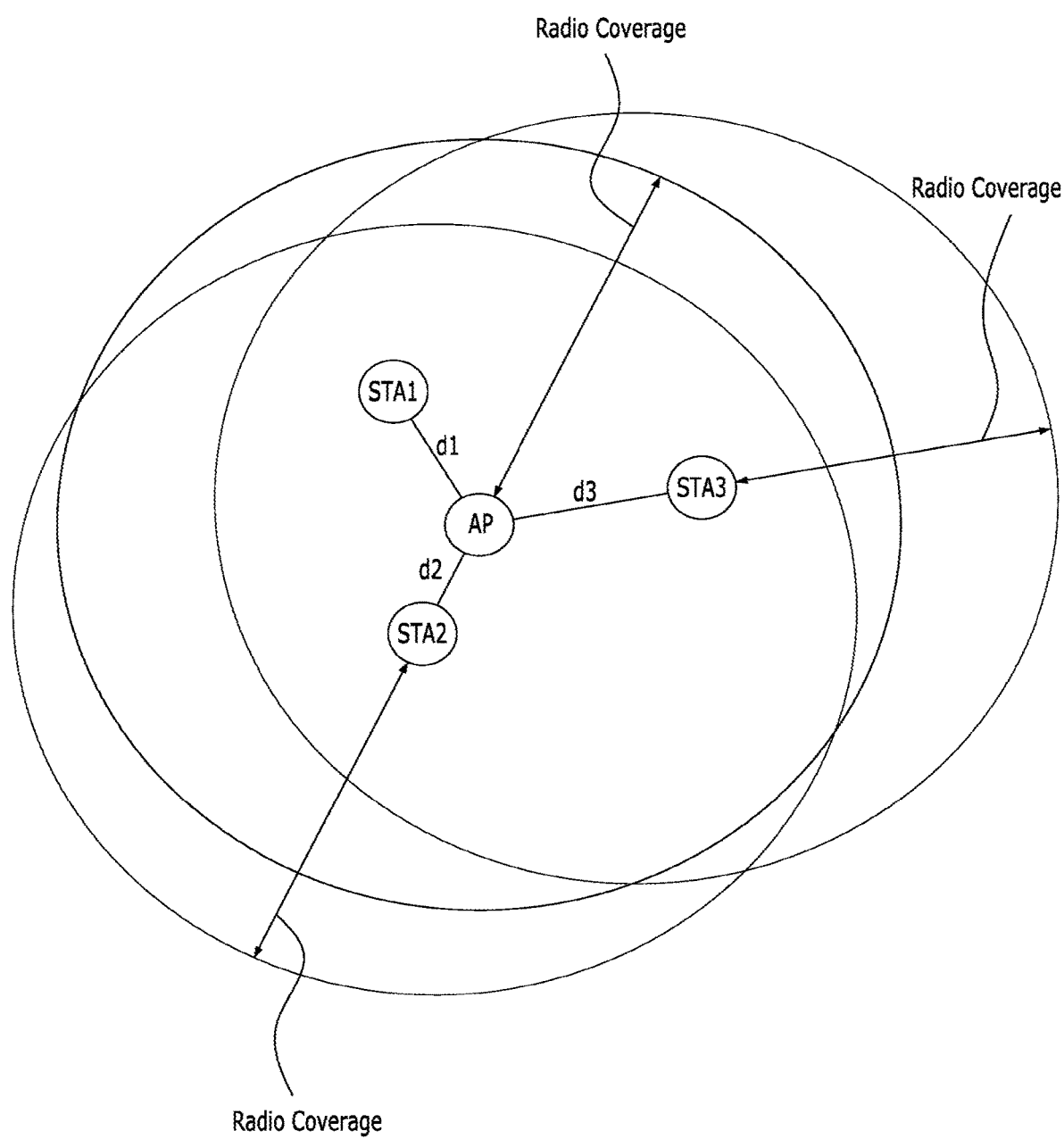
FIGS. 2A and 2B are diagrams illustrating radio ranges in accordance with a conventional method and the radio ranges of a high-speed mode and a low-power mode in accordance with the embodiment of the present invention.
Figure 2B:
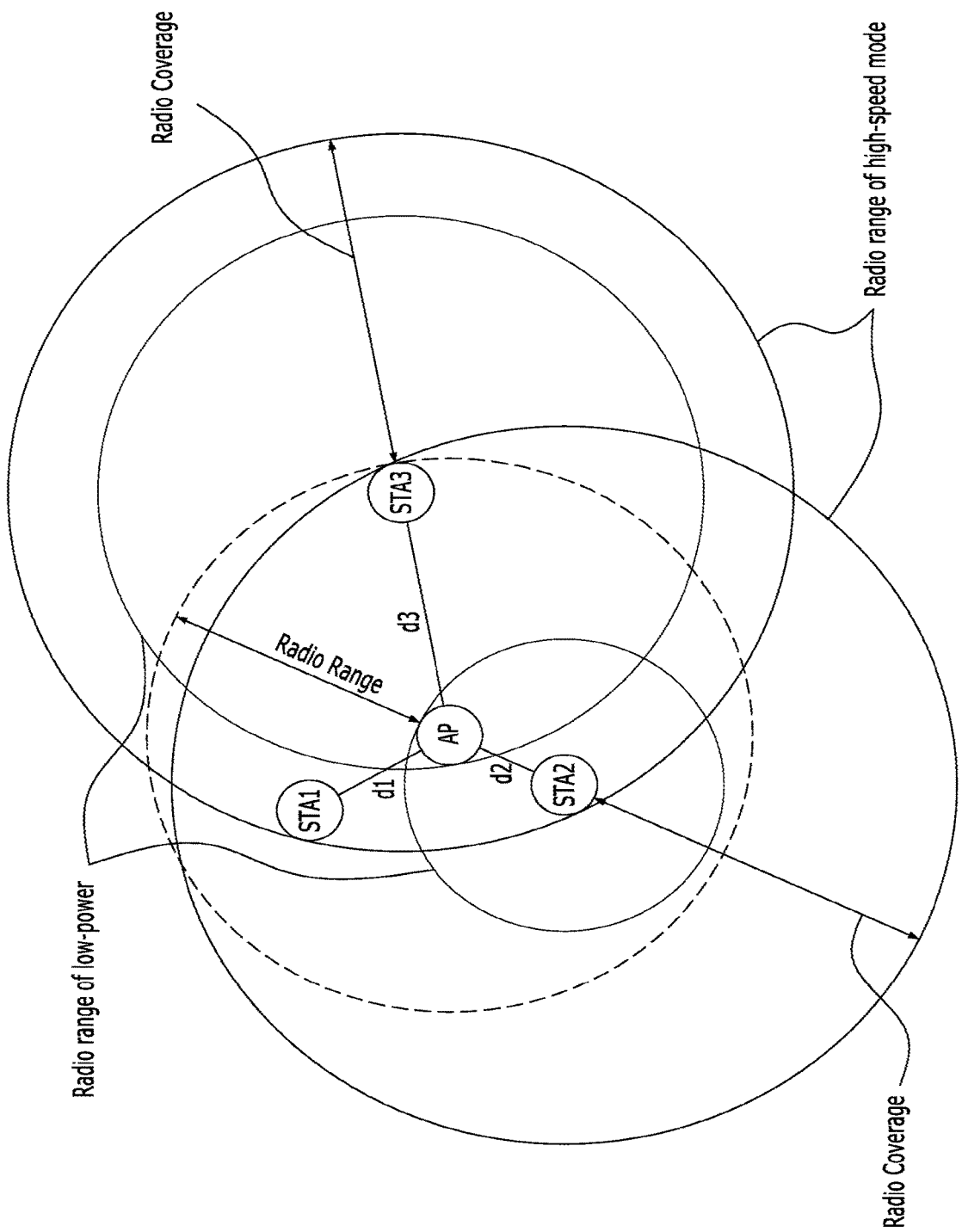

FIGS. 2A and 2B are diagrams illustrating radio ranges in accordance with a conventional method and the radio ranges of the high-speed mode and the low-power mode in accordance with the embodiment of the present invention.

FIG. 2A illustrates the radio ranges of an access point and second and third stations in the conventional method. The radio ranges of FIG. 2A depend on the maximum power mode. FIG. 2B illustrates the radio ranges of second and third stations in the high-speed mode and the low-power mode and the radio range of an AP in accordance with the embodiment of the present invention. In FIG. 2B, the radio range in the low-power mode indicates a radio range in which data frames and response frames are transmitted and received, and the radio range of the low-power mode is narrower than that of the high-speed mode.

In FIGS. 2A and 2B, the distances between the AP and the respective stations are equal to each other. That is, it can be seen in FIGS. 2A and 2B that the radio ranges of the high-speed mode and the low-power mode are narrower than the radio range according to the maximum power mode, and all the stations are included in the radio ranges. In accordance with the embodiment of the present invention, the signal collision problem may be solved, and the transmit power may be reduced, compared with the conventional method.

Meanwhile, the transmit power control method according to the path loss may be expressed as equations below. Hereafter, the transmit power control method between the first and second stations will be taken as an example.

$$PL = TPG1 - RSSI1 \qquad \text{Eq. 1}$$

For example, when the first station transmits a first frame to the second station, the path loss between the first and second stations may be expressed as Equation 1 above. In Equation 1, PL represents the path loss between the first and second stations, TPG1 represents a transmit power gain (TPG) included in the first frame transmitted by the first station, and RSSI1 represents a received signal strength indicator (RSSI) measured by the second station having received the first frame. That is, the second station may calculate the path loss by using the TPG and the RSSI included in the first frame transmitted from the first station.

$$TPG2 = RSSI2 + PL + RG \qquad \text{Eq. 2}$$

In Equation 2, TGP2 represents a TPG for a second frame transmitted to the first station, after the second station receives the first frame, and RSSI2 represents an RSSI included in the first frame received from the first station by the second station. When the channel states or station characteristics are identical, RSSI1 and RSSI2 may be equal to each other. PL represents the path loss calculated by Equation 1, and RG is a gain for satisfying required performance. That is, the second station may control the transmit power as in Equation 2 by using the path loss calculated by Equation 1, and transmit a frame at the transmit power such as TGP2.

As described above, a TPG and a RSSI may be included in transmitted and received frames, in order to acquire a path loss. Alternatively, a receiver receiving a frame may acquire a path loss by measuring an RSSI. Alternatively, a transmitted frame including transmission time information may be used to calculate a transmission/reception time difference as in the conventional method, thereby acquiring a path loss.

In the first example of FIG. 1, the first station 103 may generate the path loss between the first station 103 and the AP 101 by using a TPG included in a frame transmitted from the AP 101 and an RSSI for the frame transmitted from the AP 101. Furthermore, the first station 103 may transmit the path loss between the first station 103 and the AP 101 to the AP 101. The AP 101 may retransmit the maximum value, among the path losses transmitted from the stations, to the stations.

In the second example of FIG. 1, the first station 103 may acquire first and second path losses by using TPGs included in frames transmitted from at least one or more stations 105 or the AP 101 included in the WLAN system and RSSIs for the frames transmitted from at least one or more stations 105 or the AP 101 included in the WLAN system.

Meanwhile, the transmit power control method in accordance with the embodiment of the present invention may control the transmit power by additionally considering a variable transmit rate. In a general WLAN system, the transmit rate is not fixed, but a link adaption method is used. In the link adaption method, the transmit rate is controlled depending on a channel state variation or the like. The transmit power control method in accordance with the embodiment of the present invention additionally controls the transmit power depending on the transmit rate, that is, a data rate. This may be expressed as Equation 3 below.

$$TPG3 = RSSI2 + PL + RG + AG \qquad \text{Eq. 3}$$

In Equation 3, TPG3 represents a TPG for a third frame which the second station transmits after transmitting the second frame according to Equation 2, and AG represents a gain for increasing or reducing the transmit rate. That is, the second station may control the transmit power by using the AG as well as the path loss.

In order to increase the transmit rate while maintaining the radio ranges at the same level, the transmit power needs to be increased. Therefore, the second station may increase the transmit rate by increasing the AG. Furthermore, when the data rate of the second station is reduced, the transmit power of the second station may be further reduced while the radio range of the second station is maintained.

Meanwhile, a modulation and coding set (MCS) level depending on the transmit rate may be determined as expressed by Equation 4 below. In Equation 4, RC represents a transmit rate control value based on the AG. Furthermore, an MCS level indicates a value which increases as the transmit rate increases. Current MCS level represents an MCS level depending on a current data transmit rate, and Next MCS level represents an MCS level depending on a next data transmit rate.

$$\text{Next MCS} = \text{Current MCS} + RC \qquad \text{Eq. 4}$$

The second station may determine a proper MCS level according to a predetermined TPG. The RSSI of a reception terminal for a signal to be transmitted may be determined by the sum of the predetermined TPG of the second station and the AG. Therefore, the MCS level may be determined by estimating the RSSI according to the magnitude of the AG.

Meanwhile, according to the IEEE 802.11n standard, the first station transmits a response frame including its MCS information. The second station may select a minimum value between the MCS information included in the response frame and the MCS level of the second station, set the minimum value to an MCS value according to Equation 5 below, and then transmit a data frame. The MCS information included in the response frame is referred to as a first MCS value, and the MCS level of the second station is referred to as a second MCS value.

$$\text{Determined MCS} = \text{Min}(\text{first MCS value}, \text{second MCS value}) \qquad \text{Eq. 5}$$

In Equation 5, Min (A, B) indicates a minimum value between A and B.

That is, the second station receives the data rate information from the first station having received the frame transmitted from the second station. Furthermore, the second station may transmit a frame according to a smaller data rate between the data rate of the second station and the data rate of the first station, based on the predetermined transmit power. The first station transmitting a response frame may also set an MCS level like the second station.

The smaller the MCS level, the higher the reliability for channel variation. Therefore, in accordance with the embodiment of the present invention, the reliability for channel variation may be improved. That is, the open loop scheme in accordance with the embodiment of the present invention is combined with a close-loop-based fast link adaption scheme using a response frame which has been presented in the standards. Furthermore, as the smaller value of two MCS levels is used, the communication may be performed in a state which is more stably adapted for channel variation.

Hereafter, the transmit power control methods of the station and the AP will be described in more detail on the basis of the transmit power control method described with reference to FIGS. 1 and 2.

Figure 3:
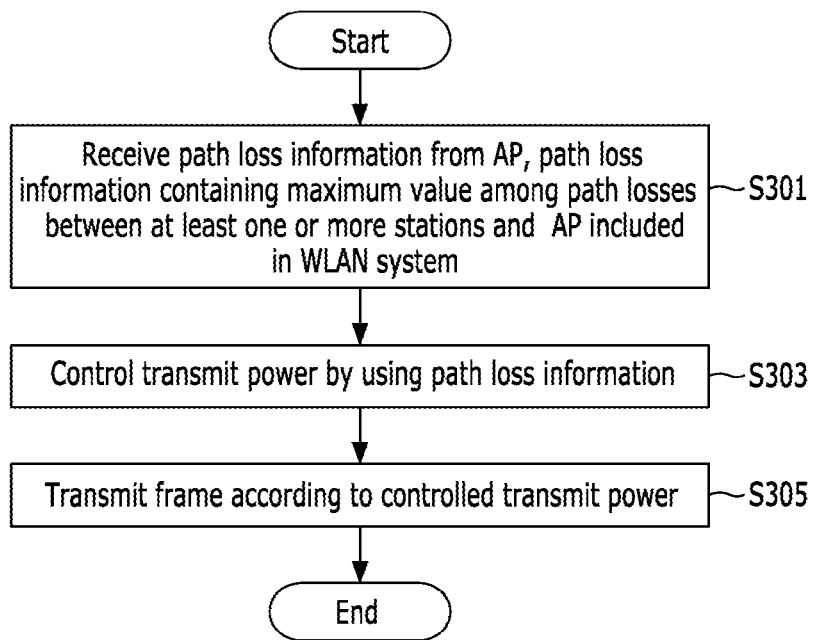
FIG. 3 is a flow chart showing a transmit power control method of a first station in accordance with an embodiment of the present invention.

FIG. 3 is a flow chart showing a transmit power control method of a first station in accordance with an embodiment of the present invention.

Referring to FIG. 3, the transmit power control method in accordance with the embodiment of the present invention starts from step S301. At the step S301, the first station receives path loss information from an AP. The path loss information includes a maximum value among path losses between the AP and at least one or more stations included in the WLAN system. The first station may transmit a path loss between the first station and the AP to the AP, and the stations included in the WLAN system may also transmit the path losses between the stations and the AP to the AP. Therefore, the AP may transmit the maximum value, among the path losses received from the stations, to the first station.

Meanwhile, the first station may generate the path loss between the first station and the AP by using a TPG included in the frame transmitted from the AP and an RSSI for the frame transmitted from the AP.

At step S303, the first station controls a transmit power by using the path loss information. At this time, the first station controls the transmit power by using a path loss obtained by adding the maximum value and the path loss between the first station and the AP or by using the path loss between the first station and the AP.

At step S305, the first station transmits a frame according to the controlled transmit power.

More specifically, when the first station operates in the high-speed mode, that is, a transmitted frame is a data frame or response frame at the step S303, the first station may control the transmit power, based on the path loss obtained by adding the maximum value and the path loss between the first station and the AP. Furthermore, when a transmitted frame is an RTS frame in the low-power mode, the first station may control the transmit power, based on the path loss obtained by adding the maximum value and the path loss between the first station and the AP. Furthermore, when the transmitted frame is a data frame or response frame in the low-power mode, the first station may control the transmit power, based on the path loss between the first station and the AP.

At the step S303, the first station may additionally control the transmit power depending on a data rate of the first station. That is, the first station may control the transmit power by additionally considering a variable transmit rate.

The transmit power control method in accordance with the embodiment of the present invention may further include receiving data rate information from the AP or a station having received the transmitted frame of the first station. At the step S305, the first station may transmit a frame according to a smaller data rate between the data rate of the first station and the received data rate, based on the transmit power of the step S303.

Figure 4:
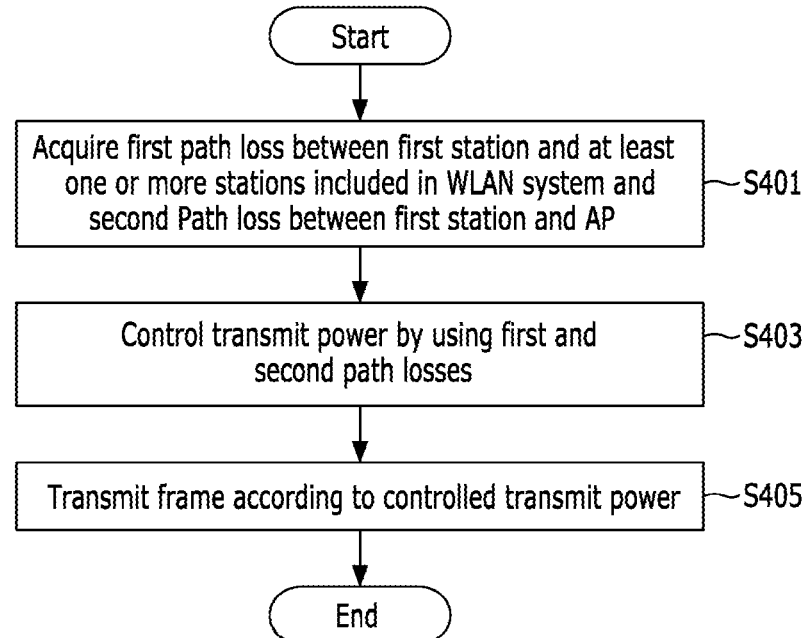
FIG. 4 is a flow chart showing a transmit power control method of a first station in accordance with another embodiment of the present invention.

FIG. 4 is a flow chart showing a transmit power control method of a first station in accordance with another embodiment of the present invention.

Referring to FIG. 4, the transmit power control method in accordance with the embodiment of the present invention starts from step S401.

At the step S401, the first station acquires a first path loss between the first station and at least one or more stations included in the WLAN system and a second path loss between the first station and the AP. More specifically, the first station may acquire the first and second path losses by using a TPG included in a frame transmitted from at least one or more stations included in the WLAN system or the AP and an RSSI for the frame transmitted from at least one or more stations or the AP.

At step S403, the first station controls a transmit power by using the first and second path losses. At this time, the first station controls the transmit power by using a maximum value of the first and second path losses or the second path loss.

At step S405, the first station transmits a frame according to the controlled transmit power.

More specifically, when the first station operates in the high-speed mode, that is, the transmitted frame is a data frame or response frame at the step S403, the first station may control the transmit power, based on the maximum value of the first and second path losses. Furthermore, when the transmitted frame is an RTS frame in the low-power mode, the first station may control the transmit power, based on the maximum value of the first and second path losses. Furthermore, when the transmitted frame is a data frame or response frame in the low-power mode, the first station may control the transmit power, based on the second path loss.

At the step S403, the first station may additionally control the transmit power depending on the data rate of the first station. That is, the first station may control the transmit power by additionally considering a variable transmit rate.

Furthermore, the transmit power control method in accordance with the embodiment of the present invention may further include receiving data rate information from the AP or a station having received the transmitted frame of the first station. At the step S405, the first station may transmit a frame according to a smaller data rate between the data rate of the first station and the received data rate, based on the transmit power of the step S403.

Figure 5:
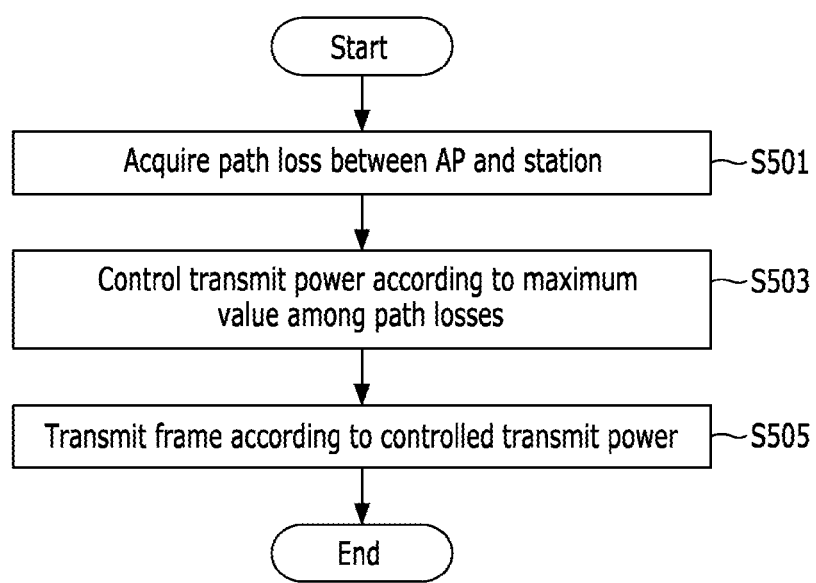
FIG. 5 is a flow chart showing a transmit power control method of an AP in accordance with another embodiment of the present invention.

FIG. 5 is a flow chart showing a transmit power control method of an AP in accordance with another embodiment of the present invention. In FIG. 5, the transmit power control method of the AP in the WLAN system including at least one or more stations will be taken as an example.

Referring to FIG. 5, the transmit power control method in accordance with the embodiment of the present invention starts from a step S501.

At the step S501, the AP acquires path losses between the AP and stations. More specifically, the AP may acquire a path loss by a TPG included in a frame transmitted from a station and an RSSI for the frame transmitted from the station or acquire a path loss between the AP and a station by receiving the path loss from the station.

At step S503, the AP controls a transmit power according to a maximum value among the path losses.

At step S505, the AP transmits a frame according to the controlled transmit power.

At the step S503, the AP may additionally control the transmit power depending on the data rate of the AP. That is, the AP may control the transmit power by additionally considering a variable transmit rate.

Furthermore, the transmit power control method in accordance with the embodiment of the present invention may further include receiving data rate information from a station having received the frame transmitted from the AP. At the step S505, the AP may transmit a frame according to a smaller data rate between the data rate of the AP and the received data rate, based on the transmit power of the step S503.

In the transmit power control method in accordance with the embodiment of the present invention, the AP may transmit a beacon frame at the maximum power. When the transmit power of the beacon frame is controlled in accordance with the embodiment of the present invention, a new station which is not included in a BSS may have difficulties in finding the beacon frame and accessing the BSS. Therefore, the transmit power control method in accordance with the embodiment of the present invention may further include transmitting a beacon frame at the maximum power, thereby solving the above-described problem. The beacon frame is transmitted at an interval of 100 ms or more. Therefore, the beacon frame has a smaller effect upon the power consumption efficiency than other frames such as a data frame.

Meanwhile, according to the transmit power control method of the AP in accordance with the embodiment of the present invention, a probability in which an overlapping BSS (OBSS) problem occurs may decrease. When the transmit power is controlled in accordance with the embodiment of the present invention, the radio range becomes narrow in comparison with the maximum power mode. Accordingly, a probability in which an intersection area with another BSS occurs may decrease.

However, when a BSS includes a general AP and station together with the AP and the station in accordance with the embodiment of the present invention, a signal collision problem may be caused by the general AP and station. In particular, such a signal collision problem does not occur in the second example of FIG. 1, but may occur in the first example of FIG. 1.

In order to solve such a problem, the transmit power control method of the AP in accordance with the embodiment of the present invention may further include controlling the transmit power to decrease, when an OBSS exists for the BSS including the AP and the station. That is, when an OBSS exists after the transmit power is controlled at the step S503, the transmit power may be reduced in such a manner as to minimize the OBSS area.

Alternatively, the transmit power control method of the AP in accordance with the embodiment of the present invention may further include changing a channel with the station, when an OBSS exists for the BSS including the AP and the station. The transmit power control method in accordance with the embodiment of the present invention may change the channel with the station, when the OBSS area exists even though the transmit power has been reduced because of the existence of the OBSS.

Figure 6:
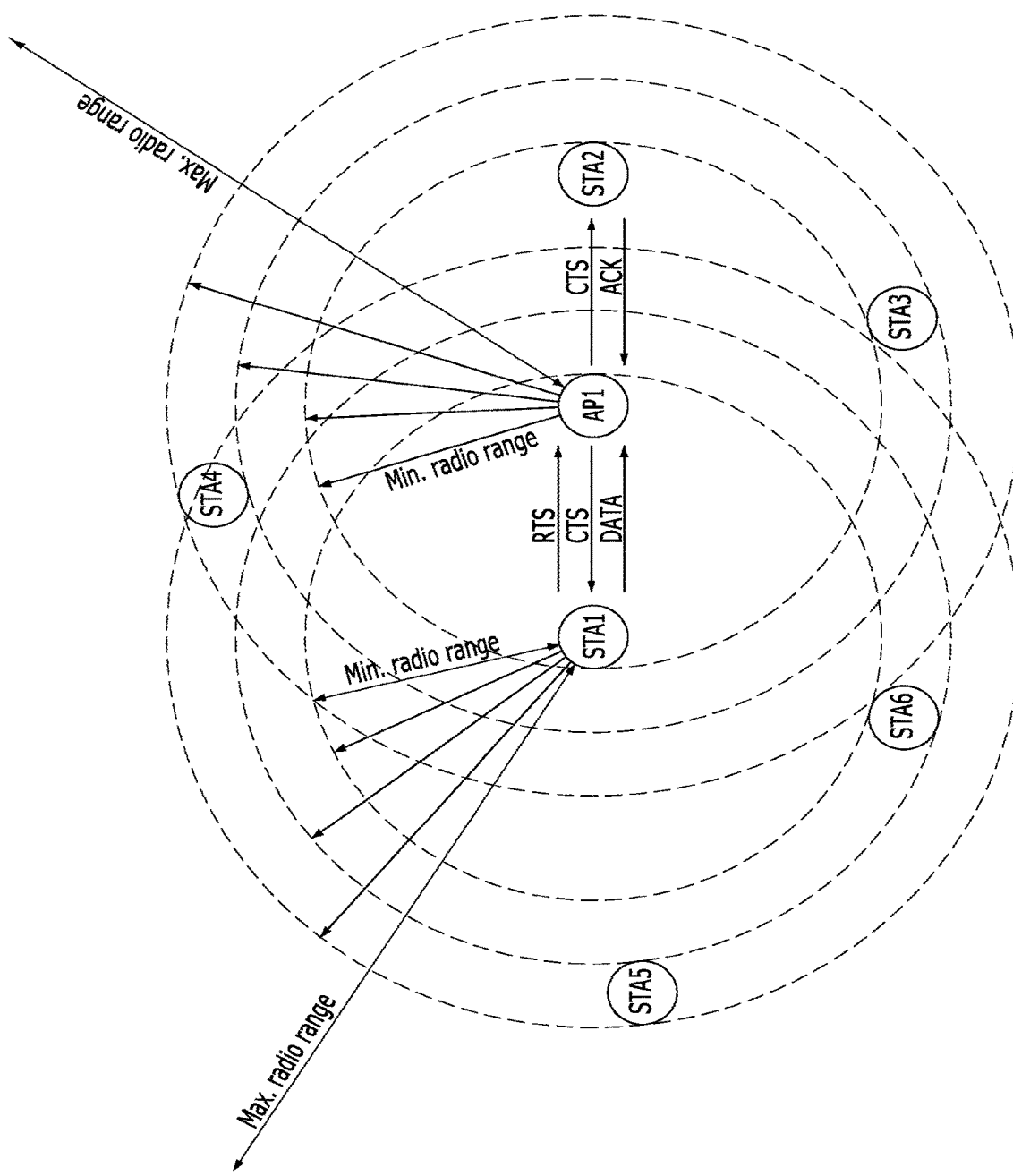
FIG. 6 is a diagram explaining a process of solving a hidden node problem in accordance with the embodiment of the present invention.

FIG. 6 is a diagram explaining a process of solving a hidden node problem in accordance with the embodiment of the present invention.

FIG. 6 shows a process of solving a hidden node problem in a WLAN system including a first AP AP1 and first to sixth stations STA1 to STA6. In FIG. 6, a circle indicated by a solid line represents the radio range of the first station, and a circle indicated by a dotted line represents the radio range of the first AP.

In accordance with the embodiment of the present invention, the radio ranges of the first AP and the first station may be varied. The first station transmits an RTS frame to the first AP, and the first AP transmits a CTS frame. The first station acquiring a transmission opportunity transmits data to the first AP. The second station receiving the CTS frame transmits a response frame to the first AP.

When the minimum radio range is used in FIG. 6, the first and second stations are included in the radio range of the first AP. Therefore, the hidden node problem does not occur for the first and second stations. However, the third to sixth stations become hidden nodes with respect to the first and second stations.

In this case, the transmit power control method in accordance with the embodiment of the present invention may solve the hidden node problem by using path loss information on the third to sixth stations. For example, when the fifth station is detected, the first station may control the transmit power by using the path loss information between the first station and the fifth station, such that the radio range is expanded. In accordance with the embodiment of the present invention, the transmit power control method may minimize the hidden node problem, and maximize the power consumption efficiency while maintaining the performance.

In FIGS. 1 to 6, the present invention has been described from the process point of view. However, the respective steps composing the transmit power control method in accordance with the embodiment of the present invention may be easily understood from the apparatus point of view. Therefore, the steps included in the transmit power control method in accordance with the embodiment of the present invention may be understood as components included in a transmit power control apparatus in accordance with the principle of the present invention.

The transmit power control apparatus in accordance with another embodiment of the present invention includes a reception unit and a control unit. The reception unit is configured to receive path loss information from an AP, the path loss information containing a maximum value among path losses between the AP and at least one or more stations included in a WLAN system. The control unit is configured to control a transmit power by using the path loss information. The control unit controls the transmit power by using a path loss obtained by adding the maximum value and a path loss between the AP and a station including the transmit power control apparatus or the path loss between the AP and the station including the transmit power control apparatus.

Here, the transmit power control apparatus may be included in a station, and the station may transmit a frame according to the controlled transmit power.

A transmit power control apparatus in accordance with another embodiment of the present invention includes an acquisition unit and a control unit. The acquisition unit is configured to acquire a first path loss between at least one or more stations and a station including the transmit power control apparatus and a second path loss between an AP and the station including the transmit power control apparatus. The control unit is configured to control a transmit power by using the first and second path losses. More specifically, the control unit controls the transmit power by using a maximum value of the first and second path losses or the second path loss between the AP and the station including the transmit power control apparatus. The transmit power control apparatus may be included in a station, and the station may transmit a frame according to the controlled transmit power.

A transmit power control apparatus in a WLAN system including one or more stations in accordance with another embodiment of the present invention includes an acquisition unit and a control unit. The acquisition unit is configured to acquire path losses between the stations and an AP including the transmit power control apparatus. The control unit is configured to control a transmit power according to a maximum value among the path losses. The transmit power control apparatus may be included in the AP, and the station may transmit a frame according to the controlled transmit power.

In accordance with the embodiment of the present invention, the transmit power is controlled according to required traffic and power consumption efficiency, which makes it possible to improve the power consumption efficiency and throughput. Furthermore, the transmit power is controlled according to the type of frame, which is possible to improve the power consumption efficiency and throughput.

Furthermore, the transmit power is controlled together with the link adaption scheme used in the WLAN standards. Therefore, it is possible to transmit a frame at a more stable transmit rate.

Furthermore, as the transmit power of the AP is controlled, it is possible to minimize the OBSS problem and the hidden node problem.

The above-described methods can also be embodied as computer programs. Codes and code segments constituting the programs may be easily construed by computer programmers skilled in the art to which the invention pertains. Furthermore, the created programs may be stored in computer-readable recording media or data storage media and may be read out and executed by the computers. Examples of the computer-readable recording media include any computer-readable recoding media, e.g., intangible media such as carrier waves, as well as tangible media such as CD or DVD.

While the present invention has been described with respect to the specific embodiments, it will be apparent to those skilled in the art that various changes and modifications may be made without departing from the spirit and scope of the invention as defined in the following claims.

What is claimed is:

1. A communication method, comprising:
transmitting, by a transmitter, a first frame to a first station, the first frame comprising a first field and a second field, wherein the first field includes first information indicating a transmit power of the first frame and the second field includes second information indicating a first target signal power for the first station and a second target signal power for a second station; and
receiving, by the transmitter, a second frame from the first station.

2. A communication apparatus, comprising:
a circuitry,
wherein the circuitry is configured to:
cause the communication apparatus to transmit a first frame to a first station, the first frame comprising a first field and a second field, wherein the first field includes first information indicating a transmit power of the first frame and the second field includes second information indicating a first target signal power for the first station and a second target signal power for a second station; and
cause the communication apparatus to receive a second frame from the first station.

3. The method of claim 1, wherein the transmit power of the first frame is associated with a first modulation and coding scheme (MCS), and wherein the transmit power of the first frame is different from another transmit power of another frame, transmitted by the transmitter, associated with a second MCS different from the first MCS.

4. The method of claim 1, wherein the transmit power of the first frame is associated with a first transmission speed and a transmit power of another frame transmitted by the transmitter is associated with a second transmission speed different from the first transmission speed, and wherein the transmit power of the first frame is different from the transmit power of the another frame.

5. The method of claim 1, wherein the second frame comprises a third field including a modulation and coding scheme (MCS) index which indicates an MCS of the second frame.

6. The method of claim 1, wherein the first frame is transmitted at an interval of 100 msec or more.

7. The communication apparatus of claim 2, wherein the transmit power of the first frame is associated with a first modulation and coding scheme (MCS), and wherein the transmit power of the first frame is different from another transmit power of another frame, transmitted by the communication apparatus, associated with a second MCS different from the first MCS.

8. The communication apparatus of claim 2, wherein the transmit power of the first frame is associated with a first transmission speed and a transmit power of another frame transmitted by the communication apparatus is associated with a second transmission speed different from the first transmission speed, and wherein the transmit power of the first frame is different from the transmit power of the another frame.

9. The communication apparatus of claim 2, wherein the second frame comprises a third field including a modulation and coding scheme (MCS) index which indicates an MCS of the second frame.

10. The communication apparatus of claim 2, wherein the first frame is transmitted at an interval of 100 msec or more.

11. A communication method, comprising:
receiving, by a first station, a first frame from a transmitter, the first frame comprising a first field and a second field, wherein the first field includes first information indicating a transmit power of the first frame and the second field includes second information indicating a first target signal power for the first station and a second target signal power for a second station;

determining, by the first station, a path loss based on the transmit power of the first frame and a measured received power of the first frame;

determining, by the first station, a second transmit power based on the first target signal power and the path loss; and transmitting, by the first station, the second frame to the transmitter based on the second transmit power.

12. The method of claim 11, wherein the transmit power of the first frame is associated with a first modulation and coding scheme (MCS), and wherein the transmit power of the first frame is different from another transmit power of another frame, transmitted by the transmitter, associated with a second MCS different from the first MCS.

13. The method of claim 11, wherein the transmit power of the first frame is associated with a first transmission speed and a transmit power of another frame transmitted by the transmitter is associated with a second transmission speed different from the first transmission speed, and wherein the transmit power of the first frame is different from the transmit power of the another frame.

14. The method of claim 11, wherein the first frame is received at an interval of 100 msec or more.

15. A communication apparatus, comprising:
a circuitry,
wherein circuitry is configured to:
cause the communication apparatus to receive a first frame from a transmitter, the first frame comprising a first field and a second field, wherein the first field includes first information indicating a transmit power of the first frame and the second field includes second information indicating a first target signal power for the communication apparatus and a second target signal power for another communication apparatus;
determine a path loss based on the transmit power of the first frame and a measured received power of the first frame;
determine a second transmit power based on the first target signal power and the path loss; and
cause the communication apparatus to transmit the second frame to the transmitter based on the second transmit power.

16. The communication apparatus of claim 15, the transmit power of the first frame is associated with a first modulation and coding scheme (MCS), and wherein the transmit power of the first frame is different from another transmit power of another frame, transmitted by the transmitter, associated with a second MCS different from the first MCS.

17. The communication apparatus of claim 15, wherein the transmit power of the first frame is associated with a first transmission speed and a transmit power of another frame transmitted by the transmitter is associated with a second transmission speed different from the first transmission speed, and wherein the transmit power of the first frame is different from the transmit power of the another frame.

18. The communication apparatus of claim 15, wherein the first frame is received at an interval of 100 msec or more.

19. The method of claim 1, wherein the transmitter is an access point (AP) and the receiving first station is a non-access point (non-AP).

20. The communication apparatus of claim 2, wherein the communication apparatus is an access point (AP) and the first station is a non-access point (non-AP).

21. The method of claim 11, wherein the transmitter is an access point (AP).

22. The communication apparatus of claim 15, wherein the transmitter is an access point (AP) and the communication apparatus is a non-access point (non-AP).

23. A device for a communication apparatus, comprising:
a circuitry,
wherein the circuitry is configured to:
cause the communication apparatus to receive a first frame from a transmitter, the first frame comprising a first field and a second field, wherein the first field includes first information indicating a transmit power of the first frame and the second field includes second information indicating a first target signal power for the communication apparatus and a second target signal power for another communication apparatus;
determine a path loss based on the transmit power of the first frame and a measured received power of the first frame;
determine a second transmit power based on the first target signal power and the path loss; and
cause the communication apparatus to transmit the second frame to the transmitter based on the second transmit power.

24. The device of claim 23, the transmit power of the first frame is associated with a first modulation and coding scheme (MCS), and wherein the transmit power of the first frame is different from another transmit power of another frame, transmitted by the transmitter, associated with a second MCS different from the first MCS.

25. The device of claim 23, wherein the transmit power of the first frame is associated with a first transmission speed and a transmit power of another frame transmitted by the transmitter is associated with a second transmission speed different from the first transmission speed, and wherein the transmit power of the first frame is different from the transmit power of the another frame.

26. The device of claim 23, wherein the first frame is received at an interval of 100 msec or more.

27. The device of claim 23, wherein the transmitter is an access point (AP) and the communication apparatus is a non-access point (non-AP).

28. The method of claim 1, wherein the first information and the second information allow the first station to determine a transmit power of the second frame.

29. The communication apparatus of claim 2, wherein the first information and the second information allow the first station to determine a transmit power of the second frame.

* * * * *